(12) United States Patent
Saito et al.

(10) Patent No.: US 7,829,136 B2
(45) Date of Patent: Nov. 9, 2010

(54) PRODUCTION METHOD OF CELL ELECTRODES

(75) Inventors: Takamitsu Saito, Kanazawa-ku (JP); Hideaki Horie, Yokosuka (JP); Taketo Kaneko, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1015 days.

(21) Appl. No.: 10/573,861

(22) PCT Filed: Nov. 1, 2005

(86) PCT No.: PCT/IB2005/003251
§ 371 (c)(1), (2), (4) Date: Mar. 27, 2006

(87) PCT Pub. No.: WO2006/048726
PCT Pub. Date: May 11, 2006

(65) Prior Publication Data
US 2007/0105328 A1   May 10, 2007

(30) Foreign Application Priority Data
Nov. 1, 2004   (JP)   ............................. 2004-318091

(51) Int. Cl.
*B05D 5/12*   (2006.01)
*B05D 3/12*   (2006.01)
*H01M 4/64*   (2006.01)

(52) U.S. Cl. .................. 427/115; 427/209; 427/369; 429/518; 429/523

(58) Field of Classification Search ................. 427/115, 427/369, 209
See application file for complete search history.

(56) References Cited

U.S. PATENT DOCUMENTS

| | | | | |
|---|---|---|---|---|
| 3,087,003 | A | * | 4/1963 | Drengler et al. ............. 264/104 |
| 3,954,502 | A | * | 5/1976 | Symons et al. ................ 429/39 |
| 4,687,598 | A | * | 8/1987 | Varma .................... 252/519.33 |
| 2003/0013016 | A1 | * | 1/2003 | Puester et al. ............... 429/210 |
| 2003/0175588 | A1 | * | 9/2003 | Zhang ........................ 429/217 |

* cited by examiner

*Primary Examiner*—Brian K Talbot
(74) *Attorney, Agent, or Firm*—Global IP Counselors, LLP

(57) ABSTRACT

The invention relates to fuel cells and methods of making bipolar fuel cell electrodes. The invention provides a method of producing bipolar fuel cell electrodes, including providing a collector having a first side and a second side opposite the first side, coating the first side with a first active material, coating the second side with a second active material, and compressing the coated collector to form a bipolar cell electrode. The invention also provides a method of producing bipolar fuel cell electrodes wherein the first side of the collector is first coated with the first active material and compressed at a first pressure, and subsequently the second side of the collector is coated with the second active material and compressed at a second pressure. The invention further provides an improved bipolar electrode for fuel cells.

19 Claims, 3 Drawing Sheets

(a)

(b) After pressing (c) After coating (d) After pressing

Same as before-pressing (e)

(f)

PRODUCTION METHOD OF CELL ELECTRODES

This application is a National Stage filing under 35 USC 371 of International Application No. PCT/IB2005/003251, filed Nov. 1, 2005, which claims priority to Japanese Patent Application No. 2004-318091, filed Nov. 1, 2004, the entire contents of each of which is incorporated herein by reference.

TECHNICAL FIELD

The invention relates to cells and cell electrodes, particularly production methods for bipolar cell electrodes.

BACKGROUND

Cells are increasingly being used due to demand for alternative energy sources and growth of the advanced electronic industries. Cells with high energy density are especially needed. One type of high energy density cell is the bipolar cell, which uses bipolar cell electrodes coated with cathode type active material on one side of the collector, and anode type active material on the other side of the collector.

SUMMARY

In general, the present invention relates to cells and methods of making bipolar cell electrodes. More specifically, the invention relates to improved cell energy rate characteristic obtained using improved bipolar cell electrodes obtained by compression of the active material layers.

In one aspect, the present invention provides a method of producing bipolar cell electrodes, including providing a collector having a first side and a second side opposite the first side, coating the first side with a first active material, coating the second side with a second active material, and compressing the coated collector to form a bipolar cell electrode In one embodiment, the invention provides a method of producing bipolar cell electrodes wherein the first side of the collector is first coated with a first active material having a first porosity and compressed at a first pressure, and subsequently the second side of the collector is coated with the second active material having a second porosity and compressed at a second pressure. Preferably, the first pressure is greater than the second pressure. More preferably, the first pressure is from about 200 to about 600 MPa, and the second pressure is from about 10 to about 200 MPa.

In some presently preferred embodiments, the first active material coating exhibits a porosity of about 35% to about 45% after compressing the coated collector at the first pressure. In other presently preferred embodiments, the second active material coating exhibits a porosity of about 30% to about 40% after compressing the coated collector at the second pressure. In still other presently preferred embodiments, the first active material contains a cathode type active material. In additional presently preferred embodiments, the second active material contains an anode type active material. More preferably, one or both of the cathode type active material and anode type active material further contains one or more of conductivity enhancement additives, binders, solid electrolytes, and electrolyte-supporting salts.

In another embodiment, the invention provides a production method for bipolar cell electrodes wherein a first crushable active material is coated on one side of the collector and compressed at a first pressure, then a second crushable active material is coated on the other side of the collector and compressed at a second pressure, wherein the first pressure is higher than the second pressure. Using this method, it may be possible to attain the best cell power production and rate characteristic by applying an optimal compression to each of the active material layers to obtain the desired porosity of the active materials on the collector.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
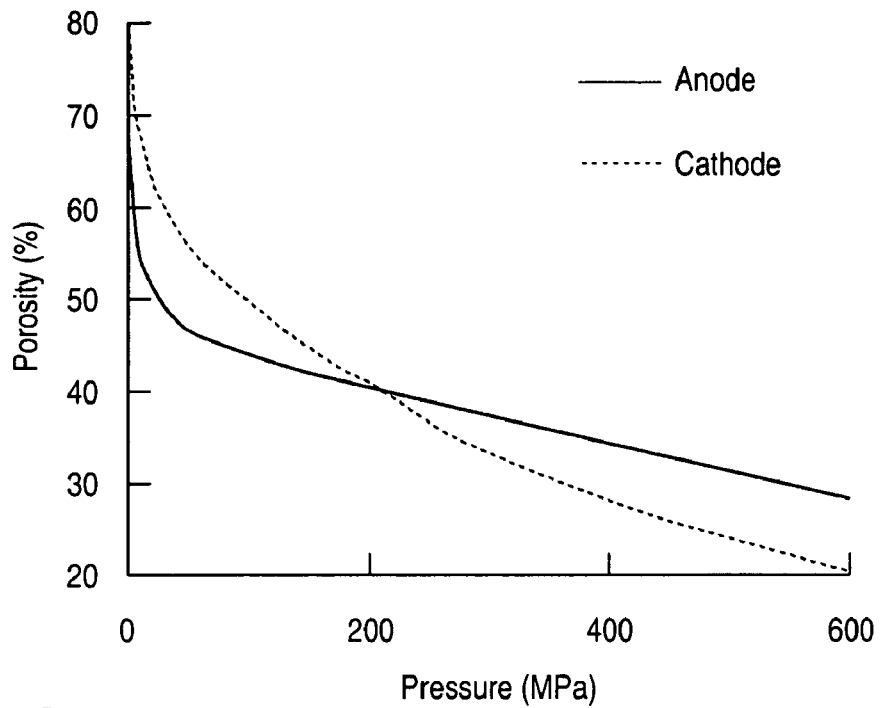
FIG. 1 is a graph showing a relationship between the compression pressure and the porosity of the active material layers of the cathode and anode of a bipolar cell electrode.

In conventional production methods of bipolar cell electrodes, a compressing process is performed after coating active electrode materials on both sides of the collector to form a cathode and anode. This compressing process simultaneously compresses both sides of the electrode material at a uniform pressure, thereby providing appropriate adhesion between the active material layers and the collector, and simultaneously adjusting the thicknesses of both of the active material layers to a predetermined range.

In some cases, however, expected performance of the bipolar cell electrode may not be obtained. Different cathode type and anode type active materials of different compaction characteristics produce different thicknesses of the layers when compressed at the same pressure. To overcome the above deficiency, a method of producing bipolar cell electrodes from collectors having both sides coated with active material layers was developed. In one embodiment, this method includes coating a first active material on the collector and compressing the first coated side of the collector at a first pressure, then coating a second active material and compressing the other side of the collector at a second pressure.

Bipolar cells can be any known bipolar cells; hereafter a lithium ion cell is used as atypical example. Electrodes used in bipolar cells are structured as cathode type active material layer is built up on one side of collector or collecting foil, while anode type active material layer is built up on the other side. Collectors used in this invention are not limited to any specific types. Any known collectors can be used. For instance, aluminum foil, stainless (SUS) foil, clad material of nickel and aluminum, clad material of copper and aluminum, clad material of SUS and aluminum, or any combination of them are favorably used. The thickness of the collector is usually 1-100 micrometers.

Cathode type active materials used in this invention are not limited to any specific types. Any known materials, such as complex oxides of transition element metals and lithium can be used favorably. For example, Li—Mn complex oxides such as $LiMn_2O_4$, Li—Co complex oxides such as $LiCoC_2$, Li—Cr complex oxides such as $LiCr_2O_7$ or $Li_2CrO_4$, Li—Ni complex oxides such as $LiNiO_2$, Li—Fe complex oxides such as $LiFeO_2$, or any other substitutes of transition element metals (such as $LiNi_xCO_{1-x}O_2$ (0<x<1)) can be used.

In addition, conductivity additives such as acetylene black, carbon black or graphite, binders such as polyvinylidene fluoride (PVdF) or styrene-butadiene rubber, solid electrolyte such as polyethylene oxide, polypropylene oxide or copolymer of them, and electrolyte supporting salts to improve ion conductivity such as $LiPF_6$, $LiBF_4$, $LiClO_4$, $LiAsF_6$, $LiTaF_6$, $LiAlCl_4$, $Li_2Bo_{10}Cl_{10}$, $LiCF_3SO_3$, $Li(CF_3SO_2)_2N$, $Li(C_2F_5SO_2)_2$ can be used as necessary. Here, the thickness of cathode type active material layers are usually 1-500 micrometers.

Anode type active materials used in this invention are not limited to any specific type, and can be chosen appropriately from lithium metal, lithium alloys, lithium-transition element metal complex oxides, carbon materials and oxide materials. In addition, conductivity additives to improve electron conductivity, binders, solid electrolyte, and electrolyte supporting salts to improve ion conductivity can be used as necessary. Here, the thickness of the anode type active material layers is usually 1-500 micrometers.

A cell is fabricated with the above-mentioned cathode type active material layers of the bipolar electrodes, other anode type active material layers of bipolar electrodes, and electrolyte layers between them. Bipolar batteries, as layer-built cells, are fabricated by building up the cells. Here, electrolytes can be any known electrolytes, such as liquid, gel, or solid electrolytes.

Electrode design is important to achieve high output power in lithium ion batteries. In one aspect, the disclosure provides a process for producing a bipolar cell electrode, including coating a first side of a collector with a first material having a characteristic which transforms the coated first side into one of an active anode or an active cathode after compressing the coated first side at a first pressure, and coating a second side of the collector with a second material having a characteristic which transforms the coated second side into the alternative one of the active anode or the active cathode after compressing at a second pressure that is less than the first pressure. One exemplary material characteristic that may be altered by application of a pressure to a coated collector is porosity of the coated layer.

The porosity of the active material layers of the electrode is particularly important. Here porosity is calculated as follows:

Porosity=$(A-B)/A$

Here A: volume of the active material layer (thickness× length×width of the layer)

B: weight of the active material/true density of the active material.

In determining porosity of the first coating, the volume of the active material and the active material weight of the first coating ("collector's weight with coating of active material layer on one side"-"collector's weight") is used for B; alternatively, the volume of the active material and the active material weight of the second coating ("collector's weight with coating of active material layers on both sides"-"collector's weight with coating of active material layer on one side") may be used to calculate a porosity. The true density of active material is: (1) when the active material consists of single ingredient, the true density of the ingredient is used, (2) when the active material consists of multiple ingredients, the true density is the sum of each ingredient multiplied by the weight rate. Solvents are not included in the calculation, supposing all solvents are evaporated during an evaporation process.

FIG. 1 shows a relationship between the pressure of compressing and the porosity of the active material layers. According to FIG. 1, when a single uniform pressure is used to compress a collector coated on each side with an active material layer defining a cathode or an anode, the porosity of the cathode and anode becomes the same. If different pressures are used to compress each active material layer on the collector, however, their porosities are different. Generally, the porosity of cathode tends to decrease gradually as the pressure increases. Generally, the porosity of the anode decreases sharply as the pressure increases, then decreases gradually. Thus, it is preferable to compress the cathode active material layer first and at a higher pressure than the anode active material layer, which is preferably compressed after compressing the cathode active material layer.

In addition, the amount of lithium ions in the electrode is set by the porosity, which greatly affects the cell energy rate (load) characteristics. Therefore the relationship between the porosity and the cell energy rate characteristics was studied. The cell energy rate characteristics relate to the discharge capacity when electric current is completely discharged with predetermined current from a fully electrically charged condition. This means that the electrical discharge efficiency is generally more efficient when the cell energy rate characteristics become larger.

Figure 2:
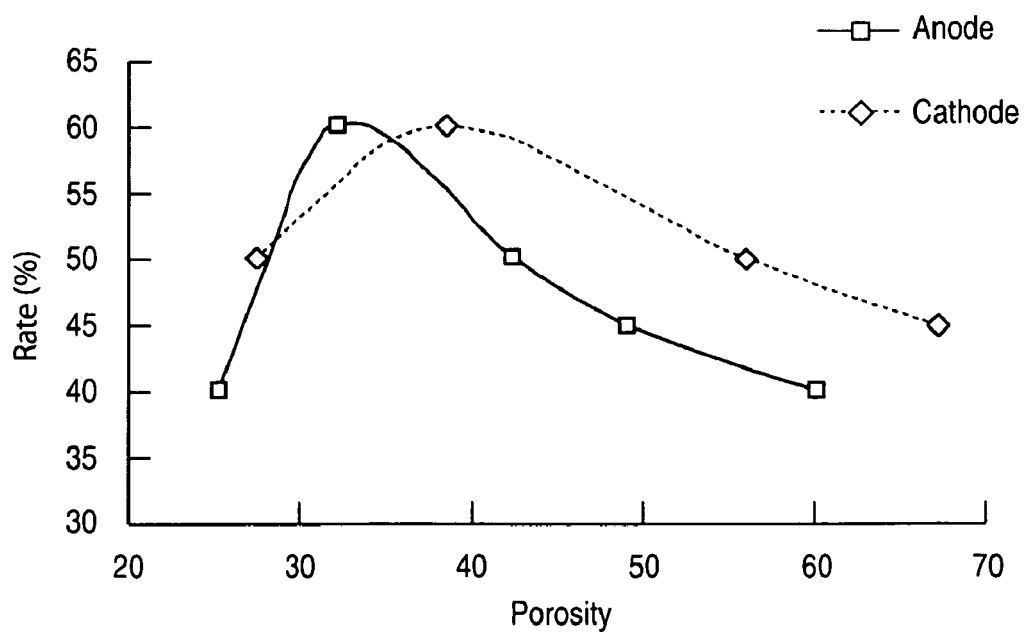
FIG. 2 is a graph showing a relationship between the porosity of the cathode and anode active material layers and the rate characteristics of bipolar cells.

FIG. 2 shows a relationship between the porosity and the cell energy rate characteristics. According to FIG. 2, each of the cathode and anode has its relative maximum value, but the respective porosities at each of the relative maximum values are different. Thus, by choosing an appropriate optimum porosity for each of the cathode and the anode, one can attain the maximum cell energy rate characteristics.

Moreover, there is a relationship between the cell energy rate characteristic and the pressure applied during the compression step for each layer. According to FIG. 2, the porosity at the maximum rate is approximately 40% for the cathode and approximately 32% for the anode. On the other hand, according to FIG. 1, the optimum pressure for compressing each of above-mentioned active material layers to the target optimum porosity is approximately 200 MPa for the cathode and approximately 500 MPa for the anode.

For the case where the cathode and anode are both coated on the collector and then compressed (or the case where the cathode is coated and compressed, then the anode is coated and compressed), consider that the cathode side is compressed first, then the anode side is compressed. Even though the cathode has the maximum cell energy rate at approximately 200 MPa, additional compressing at approximately 500 MPa during compressing of the anode side affects the cathode side with the additional approximately 500 MPa, which causes a decrease in the porosity, as well as the cell energy rate. Therefore, to attain the optimum rate, the anode side, which has a higher optimum compression pressure should be compressed first, then the cathode side should be compressed afterwards. In addition, higher compression pressure means the active material layer has a higher resistance to compaction, and lower compression pressure means the active material layer has a lower resistance to compaction.

The resistance of an active material layer to compaction may be expressed as the crush-resistance, defined as the ratio of the porosity of the material layer determined after applying a pressure to the layer, to the porosity of the active material layer measured before applying the pressure to the layer, expressed as a percentage. Thus, a crush-resistant material layer generally exhibits a crush-resistance of about 30% or higher, more preferably 40% or higher, most preferably 50% or higher. Similarly, a crushable material layer generally exhibits a crush-resistance of less than about 50%, more preferably 40% or less, most preferably 30% or less. It will be understood that materials exhibiting a crush-resistance between about 30% and about 50% may be used as either crush-resistant or crushable active materials according to some embodiments of this invention.

The crush-resistance of the active material layers when coated on the collector as a function of the cathode or anode coating order, the chemical and physical properties of the active materials coated on the collector, and the order of compressing, were evaluated according to the following methodology:

(1) The exemplary cathode precursor was generally made by coating a collector with cathode type active material on one side and evaporating the coating solvents. The exemplary anode precursor was generally made by coating one side of another collector with anode type active material and evaporating the coating solvents.

(2) Each of the cathode precursor and anode precursor coated on the collectors were compressed individually to obtain a porosity, which was measured.

(3) Next, the energy rate characteristic of the coated collector was measured for each of the cathode precursor and anode precursor, respectively.

(4) The porosity at the maximum energy rate characteristic was found, and the optimum pressure corresponding to that porosity was determined for each of the cathode active material layer and the anode active material layer.

As a result, it is preferable to coat and compress first the active material layer which is more crush-resistant and has a higher optimum compression pressure to obtain the optimum and cell energy rate characteristic, then coat and compress the other active material layer with lower crush-resistance and lower optimum compression pressure to obtain the optimum porosity and energy rate characteristic. By sequentially compressing the active material layers on the collector, first at a higher pressure, then at a lower pressure, the optimum energy rate characteristic for each of the cathode and anode active material layer scan be obtained. When both the cathode and anode active materials are similar in terms of grain size, strength and components, naturally, a quick method to gain cell rate characteristic directly without measuring porosity can be adopted, because similar porosities are expected after compressing at a specified pressure.

Based on the knowledge above, a continuous production method for bipolar cell electrodes can be defined, wherein both sides of a collector are coated, and wherein one side is coated with a first active material which is crush-resistant, and the other side is coated with a second active material which is crushable, and wherein the first active material is coated and compressed on one side of the collector first, and then the second active material is coated and compressed on the other side of the collector. Preferably, the first active material is a cathode type active material, and the second active material is an anode type active material. However, if a hard material (such as hard carbon) is used as the anode type active material, it is preferred that anode type active material be coated and compressed on one side of collector at a first pressure, then that the cathode type active material be coated on the other side of the collector and the coated collector recompressed at a second pressure, wherein the second pressure is preferably less than the first pressure.

The coating can be carried out by a known method such as using a die coater or roll coater, and the compressing can be done by a general method used in cell production, not to limit any specific methods, as long as it can compress the entire surface of the active material layer in a substantially uniform manner.

Figure 3A:
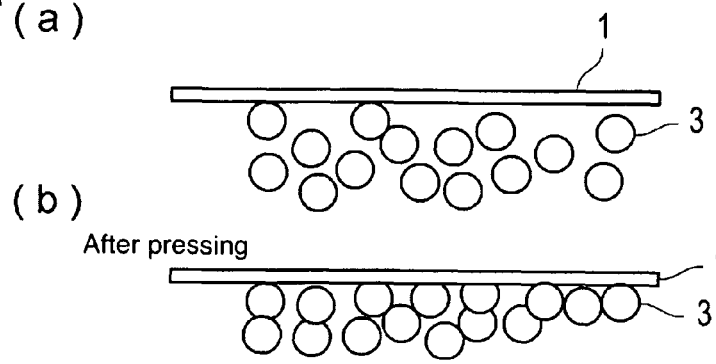
FIGS. 3A and 3B are schematic representations of the electrode compression process.
Figure 3A:
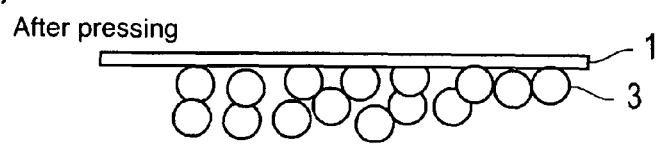
Figure 3A:
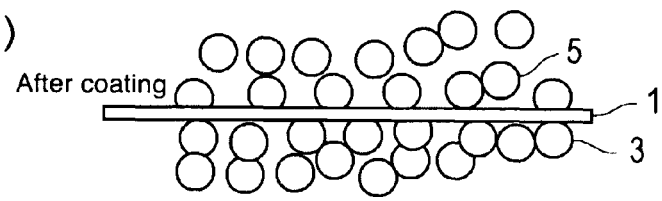
Figure 3A:
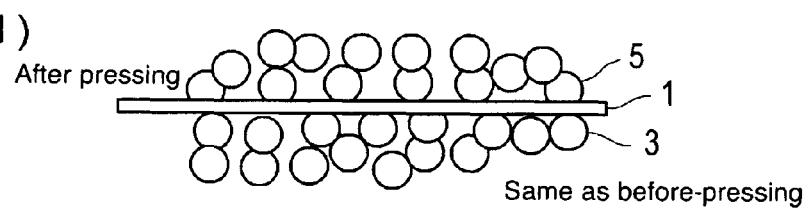
Figure 3B:
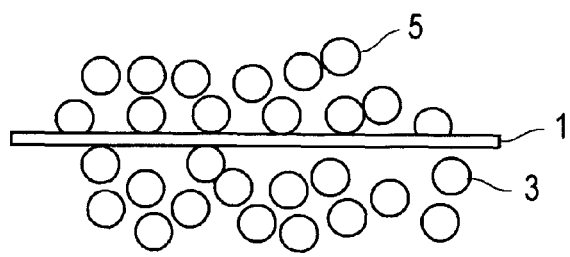
Figure 3B:
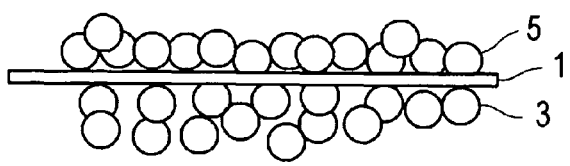

FIGS. 3A-3B schematically illustrate the compression process of this invention. In FIGS. 3A-3B, the active material is shown as circles to understand more easily the effect of the compression process, without implying any limitation on the shape, shape uniformity or size distribution of the active material. FIG. 3A(a) shows the status after coating first active material 3 onto the collector 1. FIG. 3A(b) shows the status of the coated first active material 3 on the collector 1 after compressing. FIG. 3A(c) shows the status of the coated first active material 3 on the collector 1 after coating second active material 5 on the opposite side of the collector (1). FIG. 3A(d) shows the status of the coated first active material 3 and coated second active material layer 5 on the collector 1 after re-compressing. In FIG. 3 A(d), the first active material 3 layer on the collector 1 shows practically the same porosity after the second compression step as after the first compression step.

FIG. 3B is for comparison, and describes the result of a single compression process applied to the coatings after coating both sides of the collector 1; one side coated with a conventional cathode material 3, the other side coated with a conventional anode material 5. FIG. 3B(e) shows the porosity after coating the collector 1 on one side with a conventional cathode type active material 5; and a conventional, anode type active materials, respectively. FIG. 3B(f) shows the porosity of the coated collector after compressing the conventional cathode type active material 5; and the conventional, anode type active materials coated on the collector 1.

In FIG. 3B(f), the cathode type active material layer 5 is shown positioned above the collector 1, and has low porosity, with less ion holding, smaller passages, and higher electron resistance. The anode type active material layer 3, shown underneath the collector 1, being more crush-resistant than the crushable cathode type active material layer 5, shows high porosity, with correspondingly higher electron-resistance.

The compressing process is usually carried out at room temperature, however, it can be done at any higher from room temperature up to 130° C., for example, at which the materials don't deform or decompose. By raising the temperature, the compressing process time can be shortened. Even in that case, the relationships in FIGS. 1 and 2 generally can be used.

While not wishing to be bound by any particular theory, the inventors believe that with the above-mentioned method, good electron-conductivity and ion flow can be ensured by compressing each of the active material layers coated on a collector with an optimum pressure to attain optimum porosity. As a result, higher output power bipolar batteries can be produced.

EXAMPLES

In the examples that follow, various coated collectors were prepared, some of which were coated and dried with cathode type active material on one side of the collectors, and others which were coated and dried with anode type active material on one side of collectors, to study the relationships between compression pressure and porosity.

For the cathode, $LiM_2O_4$ was used as the cathode type active material, carbon black was used as the conductivity additive, poly(vinylidene fluoride) (PVdF) was used as the binder, and n-methylpyrollidone (NMP) was used as the solvent to make slurry, which was coated onto one side of collector made of stainless steel foil, and dried to make cathode electrodes. For the anode, hard carbon was used as the anode type active material, PVdF was used as the binder, and NMP was used as the solvent to make a slurry, which was coated onto one side of another collector made of stainless steel foil, and dried to make anode electrodes. These electrodes were compressed, and the porosity of the active material layers were measured. The electrodes were made according to the methods described in the following Example.

Example 1

Cathode Slurry 100 g of cathode type active material ($LiMn_2O_4$) and 5 g of conductivity additive (carbon black) were measured, 5 g of polyvinylidene fluoride (PVdF) as the binder was added, and mixed by a mixer. Then N-methyl-2-pyrrolidone (NMP) as the solvent was added so that the viscosity becomes 7000 cP, mixed in vacuum to prepare slurry.

Anode Slurry:

90 wt % of hard carbon as the anode type active material and 10 wt % of PVdF as the binder were measured, NMP was added as the solvent, and mixed. Then NMP as the solvent was added so that the viscosity becomes 7000 cP, mixed in vacuum to prepare slurry.

Coating & Compressing:

First, the anode slurry was coated on a stainless steel collector with an applicator, and dried at 80° C. with a drier. Then it was compressed at a first pressure to obtain a 32% porosity for the anode layer. This first pressure was 500 MPa. Since part of the produced electrode material was intended to be used as an anode terminal electrode, the reverse side was not coated. Next, the cathode slurry was coated on the reverse side of a portion of the collector coated with the anode layer as described above, and dried at 80° C. with a drier. Then the double side coated collector was compressed at a second pressure less than the first pressure to obtain a 40% porosity for the coated cathode layer. This second pressure was 20CMPa. In addition, the cathode slurry was coated on one side of the stainless steel collector for use as a cathode terminal electrode, and dried at 80° C. with a drier. Then the cathode terminal electrode was compressed at a pressure to obtain 40% porosity of the cathode layer. This pressure was also 200 MPa.

Electrolyte Production:

The electrolyte layer was made as follows: 50 micrometer thickness polypropylene(PP) non-woven fabric is permeated with pre-gel solution of 10 wt % of monomer solution (acopolymer of polyethylene oxide and polypropylene oxide; average $M_w$ 7500-9000), which is the precursor of an ion conductive polymer matrix, 90 wt % of electrolyte which is 1:3 mixture of ethylene carbonate (EC) and dimethyl carbonate (DMC) with 1.0 mol/l $LiN(SO_2C_2F_5)_2$ (LiBETI) dissolved, and benzyldimethylketal (BDK) as a polymerization starter. Then it is sandwiched between quartz glass plates, bridging the precursor by irradiating ultraviolet light for 15 minutes, to attain a gel-polymer electrolyte layer.

Figure 4:
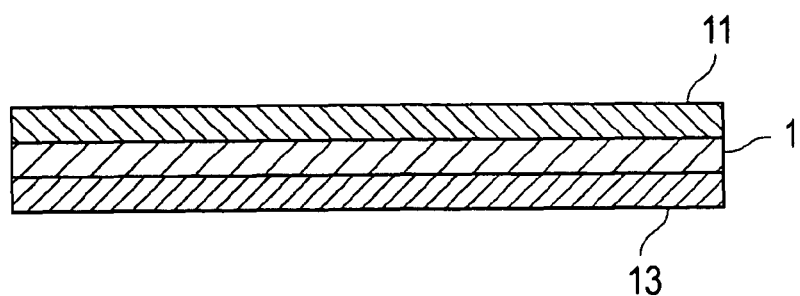
FIG. 4 shows a cross-sectional view of an exemplary bipolar cell and bipolar cell electrode assembly.
Figure 4:
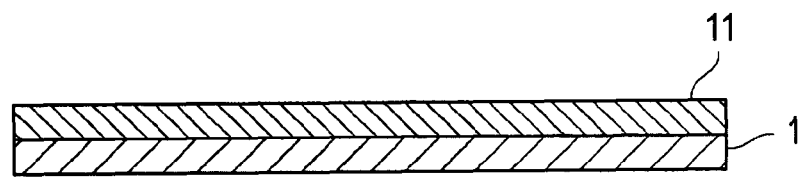
Figure 4:
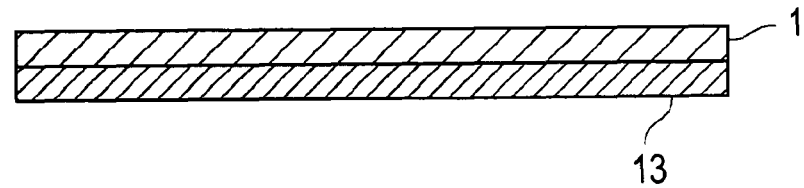
Figure 4:
Figure 4:
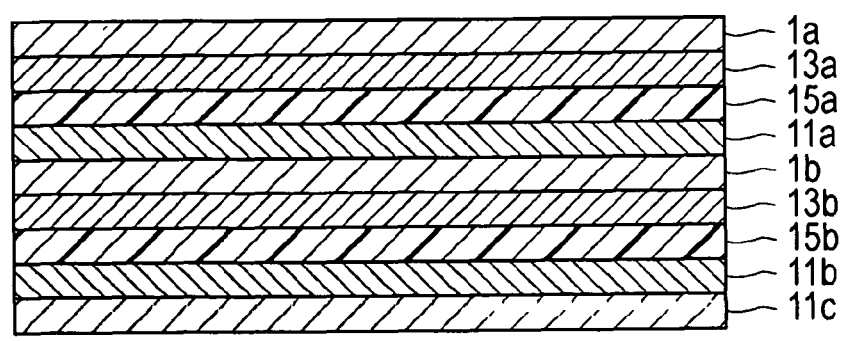

Cell Production:

FIG. 4 shows a cross sectional view of a two-layer bipolar battery sample. FIG. 4(i) is a cross-sectional view of a both-side-coated electrode, with cathode 11 shown above the collector 1, and anode 13 shown under the collector on the opposite side from the cathode 11. FIG. 4(j) is a cross-sectional view of a one-side-coated cathode electrode, with cathode 11 shown formed above the collector 1. FIG. 4(k) is a cross-sectional view of a one-side-coated anode electrode, with anode 13 shown formed under the collector 1. FIG. 4(l) is across-sectional view of an electrolyte film 15. FIG. 4(m) is a cross-sectional view of a multi-layer bipolar cell electrode assembly, formed by a first collector 1a, first anode 13a, first electrolyte film 15a, first cathode 11a, second collector 1b, second anode 13b, second electrolyte film 15b, second cathode 11b, and third collector 11c, shown from top to bottom.

The both-side-coated electrode of FIG. 4(i) made as above, as well as the one-side-coated terminal electrodes suitable for cathodes as in FIG. 4(j) and suitable for anodes as in FIG. 4(k), can be used to make a multilayer bipolar cell electrode assembly as shown in FIG. 4(m). First, the electrolyte film of FIG. 4(l) is layered over the one-side-coated anode electrode of FIG. 4(k) to form a composite structure, and then the both-side-coated electrode of FIG. 4(i) is layered on top of this composite structure. Then, another electrolyte film as shown in FIG. 4(l) is layered on the composite structure, and the one-side-coated cathode electrode as shown in FIG. 4(j) is layered on top of this film. Preferably, every layer of the electrode assembly is sealed and separated by a sealing material.

Cell Evaluation:

After production, the cells are charged to 8.4 V at 0.2° C. as cathode equivalent, discharged to 5.0 V at 0.2° C., and the cell capacity is measured. Considering the earned capacity as the standard, the cells are discharged at 100° C., and the ratio of 100° C. discharge to the 0.2° C. discharge is calculated as the energy rate characteristic.

Comparative Example 2

The slurries for cathode and anode were made using the same method and materials as in Example 1.

Coating:

First, the anode slurry was coated on a stainless collector with an applicator, and dried at 80° C. with a drier. Next, the cathode slurry was coated on the reverse side of the electrode above, and dried at 80° C. with a drier.

Compressing:

The both-side-coated cathode and anode layers on the collector as made above were compressed. The pressure of compressing was 350 MPa, and the resulting porosity was 30% in the cathode and 37% in the anode. When both sides were compressed at the same time, the maximum energy rate was not simultaneously attained for both the cathode and anode.

Various embodiments of the invention have been described. These and other embodiments are within the scope of the following claims.

We claim:

1. A method of producing a bipolar cell electrode, comprising:
    coating a first side of a collector with a first active material having a first porosity;
    compressing the coated first side of the collector at a first pressure;
    coating a second side of the collector opposite the first side with a second active material having a second porosity; and compressing the coated second side of the collector at a second pressure to form a bipolar cell electrode, the first active material coating exhibiting a porosity of about 35% to about 45% after compressing the coated collector at the first pressure and the second active material coating exhibiting a porosity of about 30% to about 40% after compressing the coated collector at the second pressure,
    the first pressure being greater than the second pressure such that the first pressure is from about 200 to about 600 MPa and the second pressure is from about 10 to about 200 MPa.

2. The method according to claim 1, wherein the first active material comprises an anode active material.

3. The method according to claim 2, wherein the anode active material comprises one or more of the group consisting of lithium metal, lithium alloys, complex oxides of lithium and transition metal elements, metal oxides, and carbon.

4. The method according to claim 1, wherein the first active material further comprises a conductivity enhancement additive.

5. The method according to claim 4, wherein the conductivity enhancement additive is selected from one or more of the group consisting of acetylene black, carbon black, and graphite.

6. The method according to claim 1, wherein the first active material further comprises a binder.

7. The method according to claim 6, wherein the binder is selected from the group consisting of polyvinylidene fluoride and styrene-butadiene rubber.

8. The method according to claim 1, wherein the first active material further comprises a solid electrolyte.

9. The method according to claim 8, wherein the solid electrolyte is selected from the group consisting of poly(ethylene)oxide, poly(propylene) oxide, and copolymers thereof.

10. The method according to claim 1, wherein the first active material further comprises an electrolyte-supporting salt.

11. The method according to claim 10, wherein the electrolyte-supporting salt is selected from the group consisting of $LiPF_6$, $LiBF_4$, $LiClO_4$, $LiAsF_6$, $LiAlCl_4$, $Li_2B_{10}Cl_{10}$, $LiCF_3SO_3$, $Li(CF_3SO_2)_2N$, and $Li(C_2F_5SO_2)_2$.

12. The method according to claim 1, wherein the second active material comprises a cathode active material.

13. The method according to claim 12, wherein the cathode active material comprises a chemical compound having a formula of $LiM_xN_{1-x}O_2$, and wherein M is a first transition metal element, N is a second transition element different from M, and x is a number from 0 to 1.

14. The method according to claim 12, wherein the cathode active material comprises a chemical compound selected from the group consisting of $LiMn_2O_4$, $LiCoO_2$, $LiCr_2O_7$, $Li_2CrO_4$, $LiNiO_2$, $LiFeO_2$, and mixtures thereof.

15. A process for producing a bipolar cell electrode, comprising:
coating a first side of a collector with a first material having a characteristic which transforms the coated first side into one of an anode or a cathode after being compressed at a first pressure;
compressing the coated first side of the collector at the first pressure;
coating a second side of the collector with a second material having a characteristic which transforms the coated second side into the other one of the anode or cathode after being compressed at a second pressure that is less than the first pressure; and
compressing the coated second side of the collector at the second pressure, the coated first material exhibiting a porosity of about 35% to about 45% after compressing the coated collector at the first pressure and the coated second material exhibiting a porosity of about 30% to about 40% after compressing the coated collector at the second pressure,
the first pressure being greater than the second pressure such that the first pressure is from about 200 to about 600 MPa and the second pressure is from about 10 to about 200 MPa.

16. A process according to claim 15, wherein the first material coating exhibits a porosity of about 35% to about 45% after compressing the coated collector at the first pressure.

17. A bipolar cell electrode produced by the process of claim 1.

18. The method according to claim 1, wherein the coated first side is foamed of a more crush-resistant material than the coated second side, with the coated first side being compressed before the coated second side.

19. A process according to claim 15, wherein the coated first side is formed of a more crush-resistant material than the coated second side, with the coated first side being compressed before the coated second side.

* * * * *